107-89.    AU 116    EX
11-27-73   CR  3,775,143

United States Patent [19]
Mikhailov et al.

[11] 3,775,143
[45] Nov. 27, 1973

[54] METHOD OF PRODUCING STRESSING CEMENT

[76] Inventors: Viktor Vasilievich Mikhailov, ulitsa Chkalova, 25, kv. 14; Semen Lvovich Litver, Bolshaya Pirogovskaya ulitsa, 37/43, korpus A, kv. 32; Alexei Nikolaevich Popov, Belyaevo-Bogorodskoe, kvartal 49, korpus 32, kv. 57; Valentina Alexandrovna Popova, Belyaevo-Bogovodskoe, kvartal 50, korpus 43, kv. 24, all of Moscow, U.S.S.R.

[22] Filed: May 17, 1972

[21] Appl. No.: 254,314

Related U.S. Application Data

[63] Continuation of Ser. No. 35,565, May 7, 1970, abandoned.

[52] U.S. Cl.................... 106/89, 106/97, 106/102, 106/104

[51] Int. Cl.................................................. C04b 7/02
[58] Field of Search.................. 106/89, 97, 102, 106/100, 103, 104

[56] References Cited
UNITED STATES PATENTS

| | | | |
|---|---|---|---|
| 3,155,526 | 11/1964 | Klein | 106/104 |
| 3,510,326 | 5/1970 | Miki | 106/104 |

*Primary Examiner*—James E. Poer
*Attorney*—Waters, Roditi, Schwartz & Nissen

[57]  ABSTRACT

A stressing cement is produced by mixing 58–62% by weight of Portland cement with an expanding component taken in an amount of 38–42% by weight. The expanding component consists of calcium sulphate, calcium oxide and an aluminate-containing material such as alumina cement or calcium hydroaluminate.

1 Claim, No Drawings

METHOD OF PRODUCING STRESSING CEMENT

Cross-Reference to Related Application

This application is a continuation of application Ser. No. 35,565, filed May 7, 1970, and now abandoned.

The present invention relates to methods of producing stressing cement.

Known in the art is a method of producing stressing cement by way of mixing or milling together Portland cement and an expanding component comprising calcium sulphate and a substance containing calcium aluminate, for instance, alumina cement, alunite, etc. (of. U.S.S.R. Inventor's Certificate No.107,996, Class 80b, 3₀₁).

The main distinction of stressing cement in contrast to other binders lies in that in the course of its hardening it is capable of expanding and performing mechanical work in tensioning the reinforcement of concrete articles, or exerting pressure on obstacles limiting its expansion. Thereby, a part of the liberated energy is consumed by the concrete upsetting, thus bringing about the general self-stressing of the structure.

It is known that when manufacturing preliminary stressed structures the reinforcement is stressed and concrete is upset by mechanical, electrothermal and electrothermomechanical methods. The stressing cement makes it possible to dispense with employment of various machines and mechanisms used when manufacturing preliminary stressed structures, and allows to automatically obtain preliminary stress in all the directions. Employment for the purpose of mechanical means is obtained with great difficulties.

Concrete and sand-and-cement mortars using the stressing cement are highly water-, benzine- and gas-proof.

The afore-described properties of the binding cement, and namely the fact that it is water-, benzine- and gas-proof and is capable of expanding, have predetermined the main spheres of its applications: pipes, containers and other tanks used for storing water and oil products.

However, the energy of the self-stress of concrete using the binding concrete, both in the form of mortars and concrete, does not exceed the values of an order of 20 to 40 kg/cm², respectively, which limits the sphere of its application.

It is an object of the present invention to provide a method of producing binding cement, whereby use is made of such components that allows substantial increase in the energy of the self-stress of this cement.

The afore-said and other objects are accomplished in that when preparing binding cement comprising an expanding component including calcium sulphate and a substance containing calcium aluminates, in accordance with the invention, calcium oxide is added to the expanding component.

Prior to mixing, the substance containing calcium aluminates may be subjected to hydration along with calcium oxide. It is expedient to hydrate the substance containing calcium aluminates and lime in order to obtain a high-alkaline calcium hydroaluminate at a temperature within the range of 20° to 150°C.

During the hydration of the substance containing calcium aluminates, calcium hydroxide may be added in an amount exceeding that necessary for formation of high-alkaline calcium hydroaluminate.

It is known that the expansion and self-stress of a structure using binding cement results from formation in the cement rock of firstly calcium hydrosulphoaluminate of a low-sulphate form, and then its recrystallization into a high-sulphate form.

Calcium hydrosulphoaluminate of a low-sulphate form is formed when there is not enough mixing water according to the following formula:

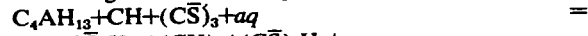
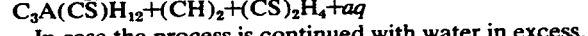

In case the process is continued with water in excess, there takes place its recrystallization into a high-sulphate form according to the formula:

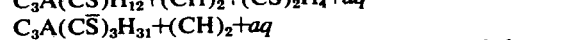

With the mixing water being in excess and the temperature not exceeding 40°C, it is not low sulphate but a high-sulphate form of calcium hydrosulphoaluminate that is formed at once according to the following reaction:

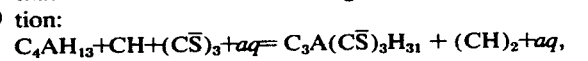

where
$C_4AH_{13}$ — is fourcalcium hydroaluminate $4CaO \cdot Al_2O_3 \cdot 13H_2O$
$CH$ — is calcium hydroxide $Ca(OH)_2$
$aq$ — is water
$C_3A(C\bar{S})H_{12}$ — is low-sulphate form of calcium hydrosulphoaluminate $3CaO \cdot Al_2O_3 \cdot CaSO_4 \cdot 12H_2O$
$(C\bar{S})_2H_4$ — is gypsum sulphate (hydrate gypsum) $2CaSO_4 \cdot 4H_2O$.
$C_3A(C\bar{S})_3H_{31}$ — is high-sulphate from of calcium hydrosulphoaluminate $3CaO \cdot Al_2O_3 \cdot 3CaSO_4 \cdot 31H_2O$
$C\bar{S}$ — is gypsum sulphate (dehydrated gypsum) $CaSO_4$ The subject of the present invention lies in intensification of the processes of formation of a low-sulphates form of calcium hydrosulphoaluminate by creating an appropriate medium in the couse of the binding cement setting and hardening by way of adding to the expanding component calcium oxide which very quickly hydrates and decreases the amount of free water in the cement rock.

To obtain a great value of the self-stress and high strength (without any drops), it is necessary to effect a correct control over the process of the cement expansion, which depends on the following three factors: the amount of the components used, the amount of the water and the temperature of the medium.

When the amount of the expanding additive exceeds the optimal one there takes place its great expansion which breaks the tight connections of the Portland cement rock, but due to the Portland cement hydroation which goes on, new connections are formed in the cement rock to compensate the broken ones, as a result of which the strength is increased.

It is necessary to take into account that a low-sulphate form is quickly formed after mixing, which form is then quickly recrystallized into a high-sulphate one provided it is not prevented from doing so by some exterior factors. With the hardening temperatures exceeding 80°C, the high-sulphate form of calcium hydrosulphate is produced but in small amounts. However, introduction in the reaction products of calcium oxide (in excess) which absorbs a part of the mixing water whose amount becomes insufficient for recrystallization of $C_3A(C\bar{S})H_{12}$ into $C_3A(C\bar{S})_3H_{31}$ is the main factor precluding formation of a high-sulphate form of calcium hydrosulphoaluminate.

To provide for a quick start and continuation of the processes of crystallization and recrystallization of calcium hydrosulphoaluminate, the ingredients of the expanding component are used in a maximumly prepared state by subjecting them to mutual hydration prior to mixing calcium aluminate with calcium oxide to obtain a high-alkaline calcium hydroaluminate. The latter is prepared from a mixture of alumina cement and lime by way of their mutual hydration and drying at a normal or high temperature ( ≈ up to 150°C) which provides for quick and complete saturation of calcium aluminates with calcium oxide. Good results are obtained with excessive free lime, in which case it is possible to dispense with separate batching of the lime to be added to cement as it is introduced in the system along with the high-alkaline calcium hydroaluminate.

Thus, as a result of the present method there is produced a four-component binder providing for the self-stressing in the concrete of up to 60–80 kg/cm², in which the presence of lime substantially alters the process of formation and recrystallization of calcium hydro-sulphoaluminate.

When manufacturing reinforced concrete articles from concrete using the binding cement the latter is mixed with water until an easy-to-handle mixture is obtained. In the course of its hardening the expansion of the cement rock is limited by the reinforcement and the whole energy of the recrystallization of calcium hydrosulphoaluminate is consumed by the tensioning of the reinforcement and upsetting of the concrete proper. Thereby there appears an intensive self-stressing of the reinforced concrete structure with all the properties of preliminary stressed reinforced concrete resulting therefrom. Due to a very great packing of the cement rock structure the concrete becomes water-, gas- and benzine-proof.

The above-described phenomenon is confirmed by the following examples.

EXAMPLE 1

The following initial materials were used (taken in weight per cent) to prepare the binding cement:
1. Portland cement — . - 58
2. High-alkaline calcium hydroaluminate — - 27.5
3. Milled building gypsum — - 12.5
4. Lime — - 2

The initial materials had the following chemical composition:

pared from the following materials taken in the following correlation (by weight per cent):

1. Alumina cement — - 70
2. Milled burnt lime — - 30

These materials had the following chemical composition:

| No. | Initial materials | Losses during calcination | Chemical composition, in weight percent | | | | | | | |
|---|---|---|---|---|---|---|---|---|---|---|
| | | | $SiO_2$ | $Al_2O_3$ | $Fe_2O_3$ | MgO | CaO | $Na_2O$ | $K_2O$ | $SO_3$ |
| 1 | Alumina cement | 0.83 | 8.97 | 44.43 | 0.35 | 0.86 | 42.16 | 0.09 | 0.08 | 234 |
| 2 | Lime | 25.6 | 5.83 | 0.47 | 0.20 | 0.41 | 67.70 | 0.05 | 0.14 | |

To produce high-alkaline calcium hydroaluminate, alumina cement and lime were carefully mixed together by hand and soluted in water added in the amount of 0.5% from the weight of the dry mixture. After it had been carefully mixed with the water, the mixture was placed into an exsiccator and hermetically sealed.

Five days later the hardened mixture was dried at a temperature of 60°C and milled down to 3000 cm³/gr.

The binding cement was prepared by way of milling its ingredients in a mill until the specific surface was 4670 cm³/gr.

The qualities of the binding cement were tested as follows:

Samples were made of prisms of the dimenstions of 20×30×100 mm and cubes of the dimensions of 30×30×30 mm, which were used for testing expansion and strength, respectively.

The samples were made from sand concrete having the composition 1:1 (binding cement: sand) by weight.

Sand having a fineness modulus of 2.06 was used as the filler. The amount of the water used for preparing the concrete constituted 30 per cent of the weight of the cement.

The newly prepared concrete mixture had a cone setting of 2.5 cm. The samples of prisms and cubes were moulded by way of slight vibration.

Reinforced prisms were manufactured to test the self-stress of the concrete.

The lengths of the samples of prisms and reinforcement were measured and the cubes were strength-tested twenty hours after they had been manufactured, i.e., at the moment of the striking, whereupon the samples were measured daily.

The values of the self-stress was evaluated in the reinforced prisms by measuring the deformation of the reinforcement and concrete, and in non-reinforced prisms by means of instruments having resilient stops precluding free elongation of the prisms in the longitudinal direction. The resilient resistance of the stops corresponded to the reinforcing coefficient $\mu = 1\%$.

The results of the tests of the concrete are given in the following table:

| No. | Initial materials | Chemical composition, in weight percent | | | | | | | Losses during calcin. in wt. percent |
|---|---|---|---|---|---|---|---|---|---|
| | | $SiO_2$ | $Al_2O_3$ | $Re_2O_3$ | MgO | CaO | $K_2O$ | $SO_3$ | |
| 1 | Portland cement | 20.91 | 4.90 | 2.81 | 6.17 | 58.7 | 1.21 | 3.22 | 1.68 |
| 2 | Gypsum | 5.45 | 0.73 | 0.25 | 2.47 | 33.9 | | 48.12 | 9.02 |
| 3 | Lime | 5.88 | 0.47 | 0.20 | 0.41 | 67.70 | 0.14 | | 25.6 |

The high-alkaline calcium hydroaluminate was pre-

| Concrete indices | Age of the samples, in days | | | | | |
|---|---|---|---|---|---|---|
| | 1 | 2 | 7 | 14 | 30 | 90 |
| Free expansion, in percent | 8.11 | 8.37 | 8.39 | 8.43 | 8.46 | 8.47 |
| Strength, in kg./cm.² | 170 | | | 272 | 268 | 374 |
| Self-stress, in kg./cm.² | 7.6 | 11.2 | 25.4 | 43.5 | 59.7 | 62.0 |

EXAMPLE 2

Preparation of binding 4-component cement

The ingredients of the binding 4-component cement were mixed in a ball mill by way of grinding, whereby the initial materials were uniformly dispersed in the mixture so that the specific surface was 4630 cm³/gr.

The composition of the initial materials (in weight per cent):
1. Portland cement — 62
2. Alumina cement — 20
3. Milled building gypsum — 14
4. Milled burnt lime — 4

These ingredients had the following chemical composition:

| No. | Initial material | Losses during calcin. in wt. percent | Chemical composition, in weight percent | | | | | | | | Hydrate water |
|---|---|---|---|---|---|---|---|---|---|---|---|
| | | | $SiO_2$ | $Al_2O_3$ | $Fe_2O_3$ | MgO | CaO | $Na_2O$ | $K_2O$ | $SO_3$ | |
| 1 | Portland cement | 0.89 | 20.73 | 5.61 | 4.12 | 6.01 | 59.42 | 0.10 | 0.89 | 2.12 | |
| 2 | Alumina cement | 1.05 | 6.66 | 48.77 | 1.10 | | 40.76 | 0.10 | 0.11 | 0.1 | |
| 3 | Gypsum | | 5.45 | 0.73 | 0.25 | 2.47 | 33.9 | | | 48.12 | 9.02 |
| 4 | Lime | 28.14 | 3.89 | 0.46 | 0.18 | 0.6 | 66.46 | 0.05 | 0.15 | | |

The qualities of the binding cement thus obtained were tested in a manner analogous to that described in Example 1.

To simultaneously test water, benzine- and gasproofness, there were manufactured conic samples, discs that were 30 mm thick.

To test the waterproofness, water pressure was applied at the side of the large base of a disc, which pressure was then raised in stages for 2 atm. an hour, and upon reaching 10 atm. was kept during 6 hours. Thereupon, the pressure was raised up to 20–24 atm and was kept at this level during 3–4 hours. A part of the samples were kept at this pressure during 1–3 days, and the pressure was controlled every 30 minutes.

To test the benzine- and gasproofness, the pressure was raised by stages for 1 atm during 1+2 hours.

The results of the evaluation of the cement qualities are presented in the following table:

| Indices of the concrete using the binding cement | Age of the samples in days | | | | |
|---|---|---|---|---|---|
| | 1 | 3 | 7 | 14 | 28 |
| Free expansion, in %% | 0.56 | 1.15 | 3.17 | 3.99 | 4.01 |
| Strength, in kg/cm² | 348 | 282 | 150 | 350 | 450 |
| Self-stress, in kg/cm² | 31 | 41.6 | 57.3 | 73.2 | 81.3 |

The following results have been obtained when testing the samples for proofness:

1. With the pressure being 20+ 24 atm., 20 samples when tested for waterproofness, have shown no filtration or water leakage.

2. With the pressure being 15 atm., the gasproofness coefficient, was $$3.7 \cdot 10^{-7} \text{ cm}^3\text{cm/cm}^2\text{sec atm.}$$

3. With the pressure being 23 atm., the benzine-proofness coefficient was $$4.0 \cdot 10^{-8} \text{ cm}^3\text{cm/cm}^2\text{sec atm}$$

As derived from the above Examples, the Portland cement is present in the ingredient mixture in an amount between 58–62%, the calcium sulphate in an amount of 12.5–14%, the calcium oxide in an amount between 2–4% and the aluminate-containing substance is an amount between 20–27.5%, the amounts being in % by weight.

What is claimed is:

1. A stressing cement composition consisting essentially of 58–62% by weight Portland cement and an expanding component consisting of 12.5 to 14% by weight calcium sulphate, 2 to 4% by weight calcium oxide and 20–27.5% by weight of an aluminate-containing material, said aluminate-containing material being alumina cement, or high-alkaline calcium hydroaluminate prepared by subjecting a high-alumina cement and lime mixture to joint hydration and heating to a temperature of from 20° to 150°C.

* * * * *